(12) United States Patent
Marsh et al.

(10) Patent No.: US 7,559,390 B2
(45) Date of Patent: Jul. 14, 2009

(54) ELECTRONIC ALL-WHEEL DRIVE MODULE WITH OVERRUNNING CLUTCH DIFFERENTIAL

(75) Inventors: Gregory A. Marsh, Ferndale, MI (US); Robert J. Degowske, Fair Haven, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 484 days.

(21) Appl. No.: 11/415,481

(22) Filed: May 1, 2006

(65) Prior Publication Data

US 2007/0251739 A1  Nov. 1, 2007

(51) Int. Cl.
*B60K 1/00* (2006.01)
*B60K 7/00* (2006.01)
*F16D 41/04* (2006.01)
*F16D 43/20* (2006.01)
*F16H 48/12* (2006.01)
*F16H 48/20* (2006.01)

(52) U.S. Cl. .................... 180/65.6; 180/65.1; 180/65.7; 180/55; 180/56; 180/57; 180/62; 192/48.92; 192/54.51; 74/650; 475/230; 475/223

(58) Field of Classification Search ............... 180/65.6, 180/65.1, 65.7, 55, 56, 57, 62; 192/48.92, 192/54.51; 74/650; 475/230, 223
See application file for complete search history.

(56) References Cited

U.S. PATENT DOCUMENTS

| | | | |
|---|---|---|---|
| 1,910,319 A | 5/1933 | Brownlee | |
| 1,921,406 A * | 8/1933 | Foust | 74/650 |
| 2,231,968 A * | 2/1941 | Thornton | 74/650 |
| 2,329,060 A * | 9/1943 | Knoblock | 74/650 |
| 2,638,794 A * | 5/1953 | Knoblock | 74/650 |
| 3,066,551 A * | 12/1962 | Burnham | 74/650 |
| 3,791,238 A | 2/1974 | Bokovoy | |
| 3,904,004 A | 9/1975 | Marx | |
| 3,935,753 A * | 2/1976 | Williams | 74/650 |
| 4,042,056 A | 8/1977 | Horwinski | |
| 4,400,996 A * | 8/1983 | Schou | 74/650 |
| 4,416,167 A * | 11/1983 | Stacy | 74/650 |
| 4,424,725 A | 1/1984 | Bawks | |
| 4,493,387 A | 1/1985 | Lake et al. | |
| 4,533,011 A | 8/1985 | Heidemeyer et al. | |
| 4,557,158 A | 12/1985 | Dissett et al. | |
| 4,718,408 A | 1/1988 | Barreiro | |
| 4,986,377 A | 1/1991 | Moriarty | |
| 5,036,939 A | 8/1991 | Johnson et al. | |
| 5,037,362 A * | 8/1991 | Teraoka et al. | 475/235 |
| 5,413,015 A * | 5/1995 | Zentmyer | 74/650 |
| 5,419,406 A | 5/1995 | Kawamoto et al. | |
| 5,428,274 A | 6/1995 | Furutani et al. | |

(Continued)

*Primary Examiner*—Glenn Dayoan
*Assistant Examiner*—John R Olszewski
(74) *Attorney, Agent, or Firm*—Harness, Dickey & Pierce, P.L.C.

(57) ABSTRACT

A drive train module with an electric motor, a clutch differential, a pair of wheel hubs and a pair of shafts, which rotatably couple the wheel hubs to the clutch differential. The clutch differential can have an input member, which can be coupled to an output shaft of the motor, and first and second overrunning clutches. The overrunning clutches permit the electric motor to drive the wheel hubs when the drive train module is activated to provide supplemental drive power, and to prevent the electric motor from being back-driven by the wheel hubs when supplemental drive power is not desired.

16 Claims, 3 Drawing Sheets

U.S. PATENT DOCUMENTS

| | | |
|---|---|---|
| 5,540,119 A | 7/1996 | Hudson |
| 5,635,805 A | 6/1997 | Ibaraki et al. |
| 5,722,502 A | 3/1998 | Kubo |
| 5,727,430 A | 3/1998 | Valente |
| 5,786,640 A | 7/1998 | Sakai et al. |
| 6,008,606 A | 12/1999 | Arai et al. |
| 6,024,182 A | 2/2000 | Hamada et al. |
| 6,155,395 A | 12/2000 | Braford, Jr. |
| 6,326,702 B1 | 12/2001 | Yonekura et al. |
| 6,333,620 B1 | 12/2001 | Schmitz et al. |
| 6,386,349 B1 | 5/2002 | Welch |
| 6,394,246 B1 | 5/2002 | Gassmann et al. |
| 6,524,215 B1 | 2/2003 | Schmidt |
| 6,691,809 B2 | 2/2004 | Hata et al. |
| 6,817,432 B2 | 11/2004 | Kitada et al. |
| 6,846,257 B2 | 1/2005 | Baker et al. |
| 7,017,542 B2 | 3/2006 | Wilton et al. |
| 7,028,583 B2 | 4/2006 | Bennett |
| 7,108,087 B2 | 9/2006 | Imai |
| 7,361,113 B2 * | 4/2008 | Puiu et al. .................. 475/221 |
| 2005/0045445 A1 | 3/2005 | Van Heteren et al. |
| 2005/0161948 A1 | 7/2005 | Yang |
| 2005/0224264 A1 | 10/2005 | Perrin |
| 2006/0201725 A1 | 9/2006 | Kano et al. |
| 2006/0225930 A1 | 10/2006 | Schulte |
| 2007/0251748 A1 * | 11/2007 | Downs et al. ............... 180/243 |

* cited by examiner

ELECTRONIC ALL-WHEEL DRIVE MODULE WITH OVERRUNNING CLUTCH DIFFERENTIAL

INTRODUCTION

The present disclosure generally relates to vehicle drive trains and more particularly to a vehicle drive train having a secondary power source that can include an electric motor and an overrunning clutch differential.

It is known in the art to provide an all-wheel drive vehicle drive train that provides drive torque to the front and rear wheels of a vehicle on either a full-time basis or a part-time but automatically-engaging basis. The known full-time all-wheel drive configurations typically utilize transfer case or a power transfer unit and a center differential or coupling to distribute drive torque to a front differential, which in turn distributes drive torque to the set of front wheels, and a rear differential, which in turn distributes drive torque to the set of rear wheels. The known part-time all-wheel drive configurations typically utilize a power transmitting coupling that permits a set of wheels (e.g., the rear wheels) to coast until the other set of wheels (e.g., the front set of wheels) begins to loose traction.

One drawback of these all-wheel drive arrangements concerns their complexity and overall cost. Not only are the components of the all-wheel drive system relatively complex and costly to manufacture and install, the associated vehicle architecture is frequently more complex due to the common practice of vehicle manufacturers to offer vehicles with a standard two-wheel configuration and an optional all-wheel drive configuration. In this regard, it is frequently necessary to modify the vehicle fuel tank and/or relocate the spare tire of the vehicle to incorporate a conventional four-wheel drive system into a two-wheel drive vehicle.

One proposed solution involves the use of wheel hub motors. In these systems, relatively large electric motors are placed within the circumference of two or more of the vehicle wheels. As wheel hub motors are relatively large in diameter, the size of the wheel tends to be relatively large (i.e., 18 inches or greater). Consequently, wheel hub motors may not be practical as when a relatively small wheel size is employed or where packaging issues, such as the size and location of a fuel tank or the location of a spare tire, prevent a wheel hub motor from being integrated into the vehicle.

In view of the above discussion, it will be apparent that it has heretofore been impractical to offer an all-wheel drive system in a relatively inexpensive vehicle platform. Accordingly, there remains a need in the art for an improved vehicle drive train that permits a vehicle to be equipped with all-wheel drive in a manner that is relatively inexpensive.

SUMMARY

In one form, the present teachings provide a drive train module for a vehicle. The drive train module can include an electric motor, a clutch differential, a pair of wheel hubs and a pair of shafts. The clutch differential can have an input member, which can be coupled to an output shaft of the electric motor, and first and second overrunning clutches. Each of the first and second overrunning clutches can have a clutch member and an output member. The clutch member can be movable between a first condition, in which rotary power is transmitted between the input member and the output member, and a second condition in which rotary power is not transmitted between the input member and the output member. Each shaft couples one of the wheel hubs with the output member of an associated one of the first and second overrunning clutches.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
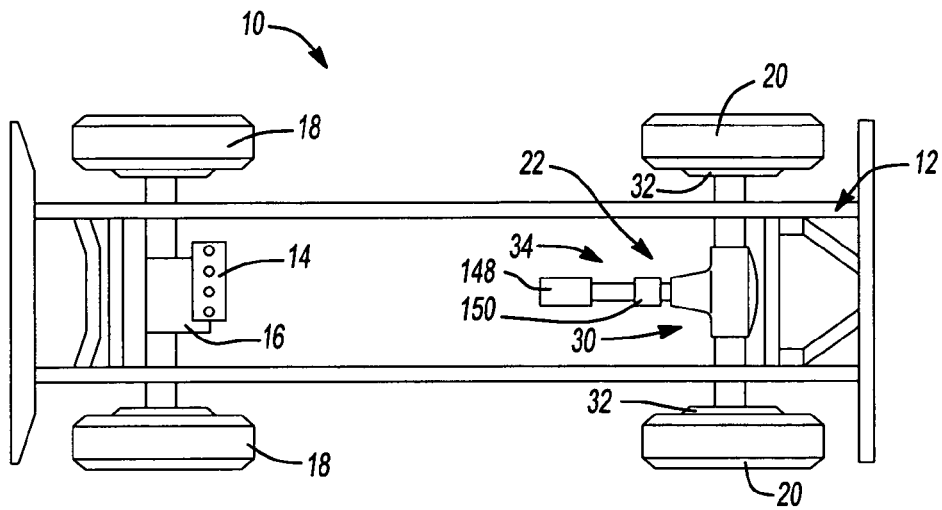
FIG. 1 is a schematic illustration of an exemplary vehicle having an auxiliary drive system constructed in accordance with the teachings of the present disclosure.

With reference to FIG. 1 of the drawings, a vehicle constructed in accordance with the teachings of the present disclosure is generally indicated by reference numeral 10. The vehicle 10 can include a body 12 to which an engine 14, a transmission 16, a set of front wheels 18, a set of rear wheels 20 and a rear drive train module 22 can be coupled. In the particular example provided, the engine 14 and transmission 16 cooperate to provide drive torque to the set of front wheels 18. The rear drive train module 22 can include an axle assembly 30, a pair of wheel hubs 32, which are coupled to respective ones of the rear wheels 20, and an auxiliary drive system 34.

Figure 2:
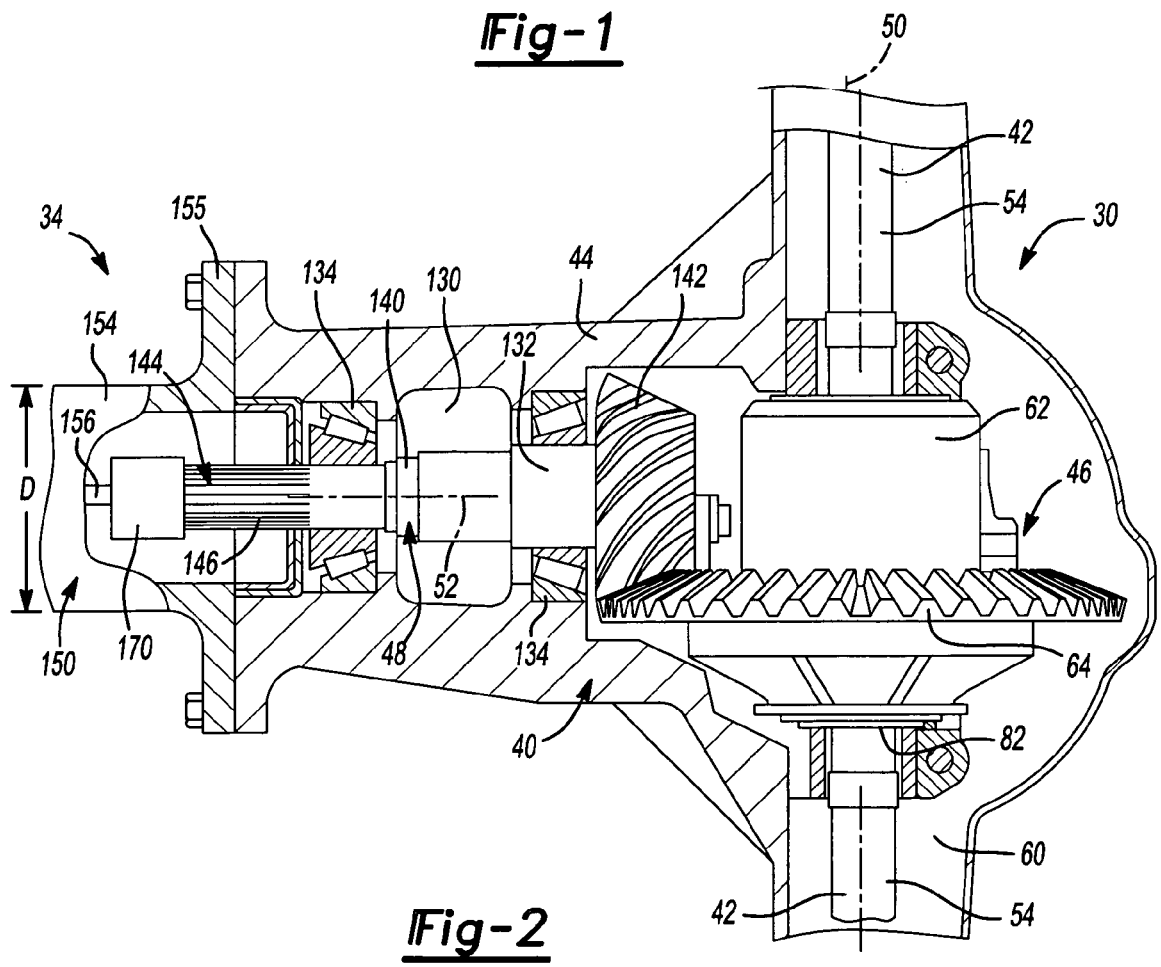
FIG. 2 is a longitudinal section view of a portion of the vehicle of FIG. 1 illustrating the axle assembly in greater detail.

In FIG. 2, the axle assembly 30 can include an overrunning clutch differential 40 and a pair of axle shaft assemblies 42. The overrunning clutch differential 40 can include a housing 44, a clutch differential unit 46 and an input shaft assembly 48. The housing 44 can support the clutch differential unit 46 for rotation about a first axis 50 and can further support the input shaft assembly 48 for rotation about a second axis 52 that is perpendicular to the first axis 50. Each axle shaft assembly 42 can include an axle half-shaft 54 that can be coupled to an associated wheel hub 32 (FIG. 1) for rotation about the first axis 50.

Figure 3:
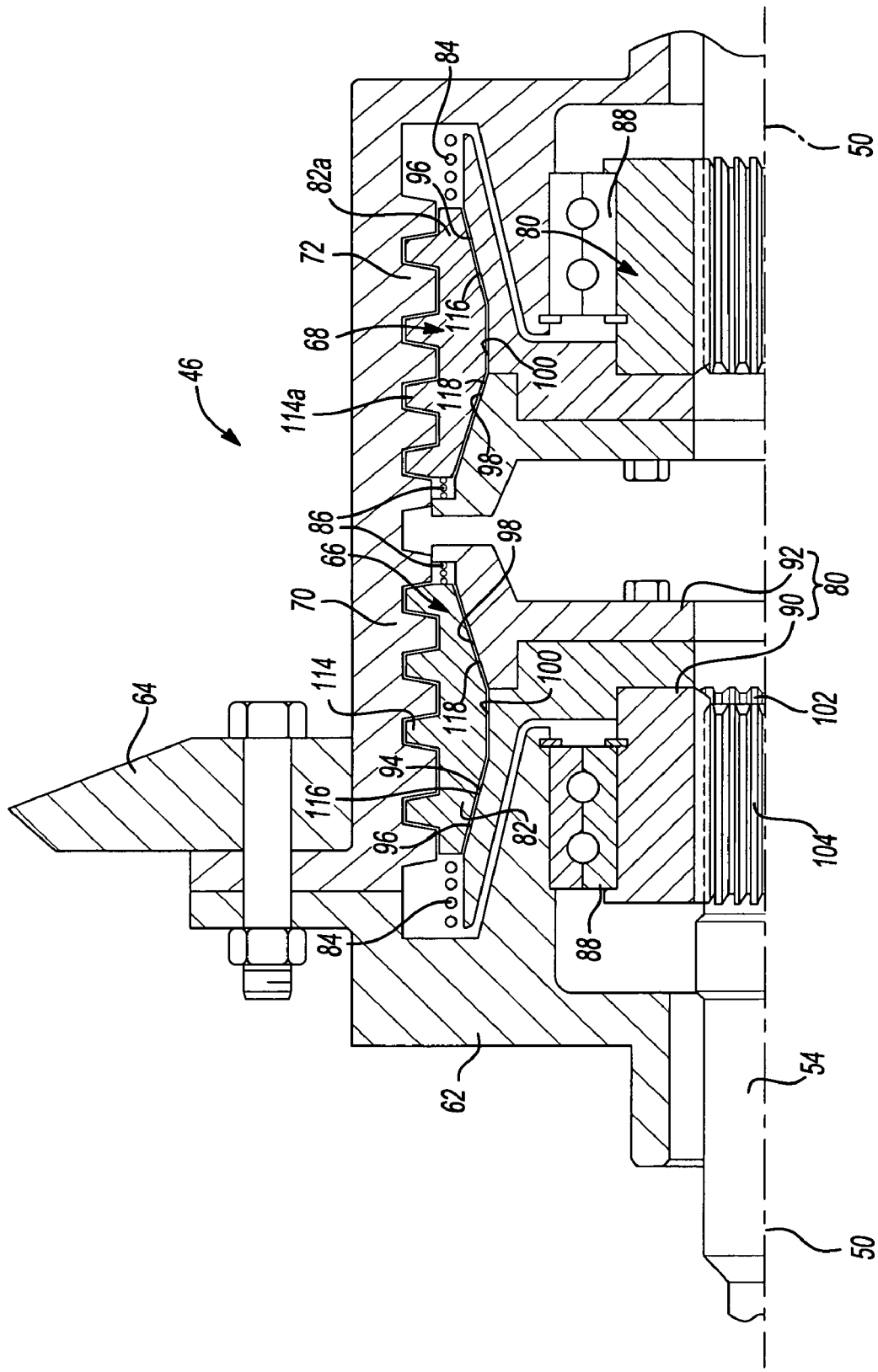
FIG. 3 is partial section view of a portion of the axle assembly illustrating the overrunning clutch differential in more detail.

With additional reference to FIG. 3, the clutch differential unit 46 can be disposed within a central cavity 60 that is defined by the housing 44 and can include a case 62, a ring gear 64 that can be fixed for rotation with the case 62, and first and second overrunning clutches 66 and 68 that can be disposed within the case 62. The case 62 can be formed to include a first internally threaded portion 70 and a second internally threaded portion 72. The first and second internally threaded portions 70 and 72 can be formed with an appropriate thread form, such as an Acme or square thread. The first internally threaded portion 70 can be threaded with threads that run in a first direction (e.g., a right-hand thread form), while the second internally threaded portion 72 can be formed with threads that run in a second direction opposite the first direction (e.g., a left-hand thread form).

Except as noted below, the first and second overrunning clutches 66 and 68 are similarly constructed and as such, only the first overrunning clutch 66 will be discussed in detail. The first overrunning clutch 66 can include an output member 80, a clutch member 82, and first and second biasing springs 84 and 86.

The output member 80 can be disposed in the case 62 and can be supported therein via a bearing 88 for rotation about the first axis 50. The output member 80 can include a body 90 and an annular structure 92 that can be coupled to the body 90. The annular structure 92 can have a face 94 that can include first and second interfaces 96 and 98, respectively, that can be disposed on opposite axial sides of a rest zone 100. The first interface 96 can taper outwardly away from the first axis 50 as one traverses the profile of the first interface 96 from a first point, which can be located adjacent the rest zone 100, to a second point that is located further from the rest zone 100. Stated another way, the first interface 96 can have a shape that corresponds to the exterior surface of a frustum.

It will be appreciated that the second interface 98 can be constructed as a mirror image of the first interface 96, as is illustrated in the particular example provided. Construction in this manner permits a common output member 80 to be used for each of the first and second overrunning clutches 66 and 68 and as such, reduces the complexity and cost of the auxiliary drive system 40 (FIG. 1). Accordingly, a detailed discussion of the second interface 98 need not be provided herein.

The axle half-shaft 54 can be coupled to the body 90 for rotation with the output member 80. In the particular example provided, the body 90 includes an internally splined aperture 102 into which a male-splined end 104 of the axle half-shaft 54 is matingly received.

The clutch member 82 can have an external thread form 114 and first and second mating interfaces 116 and 118, respectively. The external thread form 114 can threadably engage the first internally threaded portion 70 of the case 62 to thereby couple the clutch member 82 and the case 62 to one another. In this regard, rotation of the clutch member 82 relative to the case 62 will cause the clutch member 82 to translate along the first axis 50. The first and second mating interfaces 116 and 118 can be configured to matingly engage the first and second interfaces 96 and 98, respectively. In this regard, the first mating interface 116 can have a shape that can be configured to matingly engage the first interface 96, while the second mating interface 118 can have a shape that can be configured to matingly engage the second interface 98.

It will be appreciated that the clutch member 82a of the second overrunning clutch 68 includes an external thread form 114a that can threadably engage the second internally threaded portion 72 of the case 62 to thereby couple the clutch member 82a and the case 62 to one another. In this regard, rotation of the clutch member 82a relative to the case 62 will also cause the clutch member 82a to translate along the first axis 50, but in a direction that is opposite that in which the clutch member 82 translates. Those of ordinary skill in the art will appreciate that the first and second internally threaded portions 70 and 72 of the case 62 could be formed in the alternative with a single type of thread form (e.g., both the first and second internally threaded portions 70 and 72 could employ right-hand thread form).

The first and second biasing springs 84 and 86 cooperate to bias the clutch member 82 into a position relative to the rest zone 100 such that the first and second mating interfaces 116 and 118 are spaced apart from the first and second interfaces 96 and 98, respectively. The first and second biasing springs 84 and 86 can also provide frictional resistance (i.e., rotational drag) so that the clutch members 82 and 82a do not rotate with the first and second internally threaded portions 70 and 72, respectively. The first and second biasing springs 84 and 86 can be any type of resilient device, but in the particular embodiment illustrated, are helical compression-type springs.

The input shaft assembly 48 can extend through an input shaft aperture 130 in the housing 44 and can include an input pinion shaft 132 and a pair of conventional bearing assemblies 134 that cooperate with the housing 44 to support the input pinion shaft 132 for rotation on the second axis 52. The input pinion shaft 132 can include a stem portion 140 and a gear 142 that are fixedly coupled to one another. The gear 142 is configured to meshingly engage with the ring gear 64 to transmit rotary power thereto. The stem portion 140 can include a coupling portion 144, which includes a splined end section 146 in the example provided.

The auxiliary drive system 34 can include a controller 148 and a motor assembly 150. The controller 148 can be configured in a manner that is described in co-pending commonly assigned U.S. patent application Ser. No. 11/415,457 filed on even date herewith entitled "Vehicle With Hybrid Power Train Providing Part-Time All-Wheel Drive", the disclosure of which is hereby incorporated by reference as if fully set forth herein in its entirety. The motor assembly 150 can include an electric motor 154 and a mounting bracket 155 that can couple the electric motor 154 to the housing 44 of the overrunning clutch differential 40. The electric motor 154 can be a low voltage (i.e., ≦50 volts) electric motor, such as a brush-type direct current (DC) motor or a SepEx® motor, and can have an outer diameter D that is less than 8 inches and more preferably, less than about 6 inches. The electric motor 154 can have a maximum sustained torque of at least about 30 ft.-lbs. and more preferably a maximum sustained torque of about 40 ft.-lbs. to about 50 ft.-lbs. The electric motor 154 can have an output shaft 156 that can be coupled to the clutch differential 40 to provide rotary power thereto. In the particular example provided, an internally-splined coupler 170 is employed to couple the output shaft 156 to the splined end section 146 of the stem portion 140.

In situations where the case 62 rotates at a rotational speed that is less than a rotational speed at which the output members 80 of the first and second overrunning clutches 66 and 68 rotate, the clutch members 82 and 82a will be biased into a neutral position by the first and second biasing springs 84 and 86 so that the first and second mating interfaces 116 and 118 are spaced apart from the first and second interfaces 96 and 98, respectively. In this condition, drive torque cannot be transmitted between the clutch members 82 and 82a and their respective output member 80. Accordingly, the electric motor 154 cannot be back-driven by the rotation of the rear wheels 20 (FIG. 1).

In situations where the case 62 is rotating at a speed that is greater than a rotational speed at which the output members 80 of the first and second overrunning clutches 66 and 68 rotate, the clutch members 82 and 82a will rotate within the first and second internally threaded portions 70 and 72, respectively, and will translate toward one of the first and second interfaces 96 and 98 depending upon the direction in which the case 62 is rotating. Contact between an interface and a mating interface will effectively lock the clutch member 82/82a to the annular structure 92 to permit torque to be transmitted therebetween. Accordingly, drive torque generated by the electric motor 154 can be transmitted to the axle assembly 30 (FIG. 1) to aid in the propulsion of the vehicle 10 (FIG. 1).

As will be appreciated, the first and second biasing springs 84 and 86 can cooperate to disengage the clutch members 82/82a from the annular structure 92 in situations where the clutch members 82/82a decelerate so that their rotational speed is less than that of the case 62.

While the drive train module 22 has been illustrated and described as including a ring gear and pinion for transmitting rotary power between an electric motor and first and second overrunning clutches, it will be appreciated that the disclosure, in its broadest aspects, need not be so narrowly construed. For example, any power transmitting element(s), such as spur gears, belts and pulleys, chains and sprockets, friction rollers, could be employed to transmit rotary power from the electric motor to the case.

Figure 4:
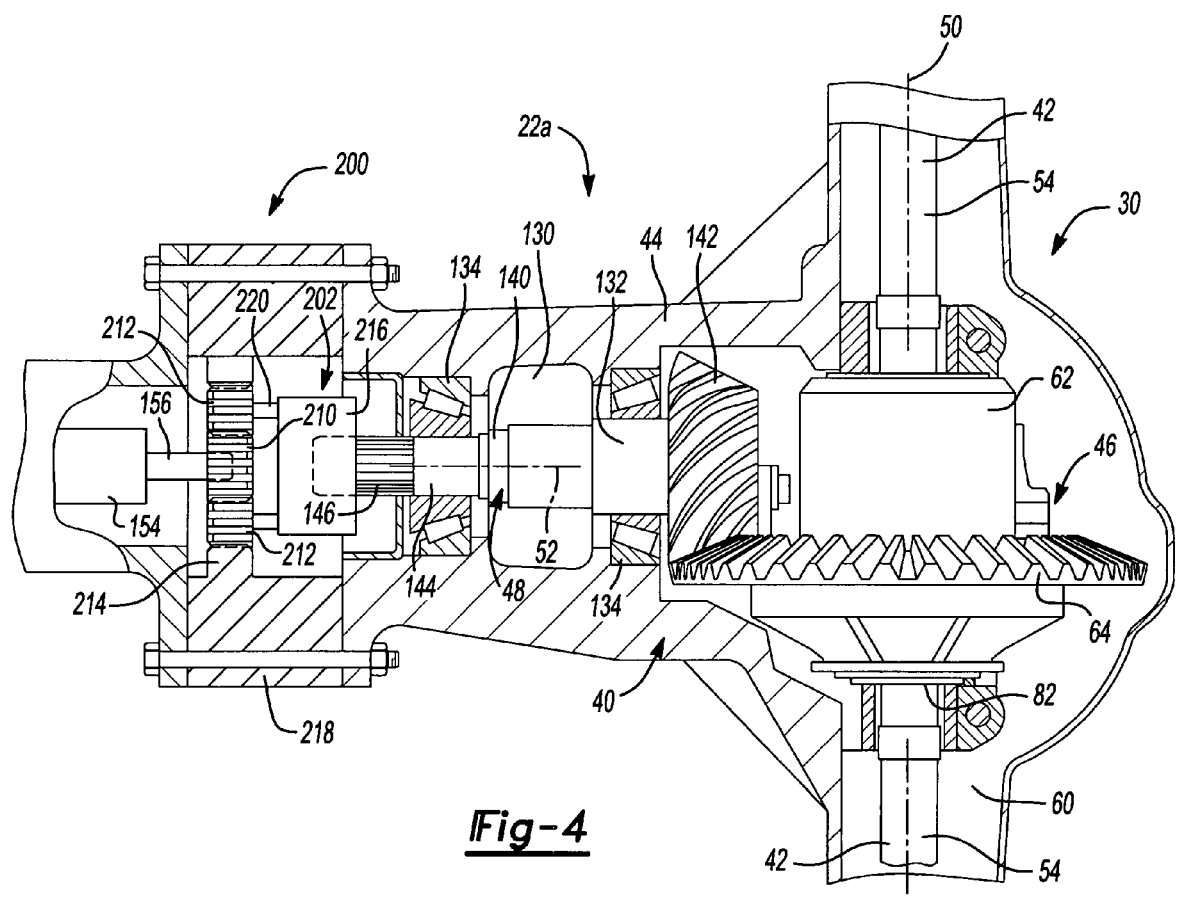
FIG. 4 is a longitudinal section view similar to that of FIG. 2 but illustrating another auxiliary drive system constructed in accordance with the teachings of the present disclosure.

Moreover, it will be understood that although the drive train module has been described as including an electric motor 154 for directly powering the input shaft assembly 48, one or more gear reductions could be employed between the electric motor 154 and the input shaft assembly 48 as is shown in FIG. 4. In this example, a gear set assembly 200 having a gear set 202 that is disposed between the electric motor 154 and the coupling portion 144 of the input shaft assembly 48. It will be appreciated that as the remainder of the drive train module 22a can be constructed in a manner that is similar to that of the drive train module 22 (FIG. 1) described above, a detailed discussion of the remainder of the drive train module 22a need not be provided herein.

The gear set 202 can include a sun gear 210, a plurality of planet gears 212, a ring gear 214 and a carrier 216. The sun gear 210 can be coupled to an output shaft 156 of the electric motor 154. The planet gears 212 can be meshingly engaged with the external teeth of the sun gear 210 and the internal teeth of the ring gear 214. The ring gear 214 can be fixedly coupled to a gear case 218 or other structure into which the gear set 202 is disposed. The carrier 216 can include a plurality of pins 220 onto which the planet gears 212 are rotatably disposed. Rotation of the sun gear 210 causes corresponding rotation of the planet gears 212, which in turn drive the pins 220 (and the carrier 216) about a rotational axis in a manner that is well known in the art. An internally-splined aperture (not specifically shown) may be formed in the carrier 216 on a side opposite the pins 220 to receive the splined end section 146 of the stem portion 140 and thereby couple the gear set 202 to the input shaft assembly 48.

While specific examples have been described in the specification and illustrated in the drawings, it will be understood by those of ordinary skill in the art that various changes may be made and equivalents may be substituted for elements thereof without departing from the scope of the present disclosure as defined in the claims. For example, it will be appreciated from this disclosure that the electric motor 154 could be another type of electric motor, such as an AC induction motor. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A drive train module for a vehicle comprising:
an electric motor having a motor output shaft;
a clutch differential having an input member, which is coupled to the motor output shaft, and first and second overrunning clutches, each of the first and second overrunning clutches having a clutch member and an output member, the clutch member being movable between a first condition, in which rotary power is transmitted between the input member and the output member, and a second condition in which rotary power is not transmitted between the input member and the output member;
a pair of wheel hubs; and
a pair of shafts, each shaft coupling one of the wheel hubs with the output member of an associated one of the first and second overrunning clutches;
wherein the input member is a housing in which the first and second overrunning clutches are rotatably disposed; and
wherein the housing includes a first internal thread form and a second internal thread form, the clutch member of the first overrunning clutch being threadably engaged to the first internal thread form and the clutch member of the second overrunning clutch being threadably engaged to the second internal thread form.

2. The drive train module of claim 1, wherein the electric motor wherein the electric motor has an outer diameter that is less than about 8 inches.

3. The drive train module of claim 2, wherein the outer diameter is less than about 6 inches.

4. The drive train module of claim 1, wherein a maximum sustained torque of an output of the electric motor is less than about 50 ft-lbs.

5. The drive train module of claim 1, wherein each output member includes a first interface that is matingly engaged by a first mating interface that is formed on the output member when the clutch members of the first and second overrunning clutches are positioned in the first position.

6. The drive train module of claim 5, the clutch member of the first and second overrunning clutches is further movable into a third position in which rotary power is transmitted between the input member and the output member.

7. The drive train module of claim 6, wherein each output member includes a second interface that is matingly engaged by a second mating interface that is formed on the output member when the clutch members of the first and second overrunning clutches are positioned in the third position.

8. The drive train module of claim 7, wherein a rest area is formed on each output member between the first and second interfaces, the rest member axially spacing apart the first and second interfaces in along an axis that is parallel to an axis along which the output member is movable.

9. The drive train module of claim 8, wherein the clutch member is biased toward the second position.

10. A drive train module for a vehicle comprising:
an electric motor having a motor output shaft;
a clutch differential having an input member, which is coupled to the motor output shaft, and first and second overrunning clutches, each of the first and second overrunning clutches having a clutch member and an output member, the clutch member being movable between a first position, a second position and a third position, rotary power being transmitted between the input member and the output member when the clutch member is positioned in the first position or the third position, rotary power not being transmitted between the input member and the output member when the clutch member is positioned in the second position;

a pair of wheel hubs; and a pair of shafts, each shaft coupling one of the wheel hubs with the output member of an associated one of the first and second overrunning clutches;

wherein the input member is a housing in which the first and second overrunning clutches are rotatably disposed; and wherein the housing includes a first internal thread form and a second internal thread form, the clutch member of the first overrunning clutch being threadably engaged to the first internal thread form and the clutch member of the second overrunning clutch being threadably engaged to the second internal thread form.

11. The drive train module of claim 10, wherein the electric motor has an outer diameter that is less than about 8 inches.

12. The drive train module of claim 11, wherein the outer diameter is less than about 6 inches.

13. The drive train module of claim 10, wherein a maximum sustained torque of an output of the electric motor is less than about 50 ft-lbs.

14. The drive train module of claim 10, wherein each output member includes a first interface and a second interface, the first interface being matingly engaged by a first mating interface that is formed on the output member when the clutch members of the first and second overrunning clutches are positioned in the first position, the second interface being matingly engaged by a second mating interface that is formed on the output member when the clutch members of the first and second overrunning clutches are positioned in the third position.

15. The drive train module of claim 14, wherein a rest area is formed on each output member between the first and second interfaces, the rest member axially spacing apart the first and second interfaces in along an axis that is parallel to an axis along which the output member is movable.

16. The drive train module of claim 10, wherein each clutch member is biased toward the second position.

* * * * *